United States Patent
Balistreri (10) Patent No.: US 10,625,543 B2
(45) Date of Patent: Apr. 21, 2020

(54) VALVE ASSEMBLY FOR A TIRE PRESSURE MANAGEMENT SYSTEM

(71) Applicant: DANA HEAVY VEHICLE SYSTEMS GROUP, LLC, Maumee, OH (US)

(72) Inventor: Lucas A. Balistreri, Maumee, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/069,751

(22) PCT Filed: Jan. 12, 2017

(86) PCT No.: PCT/US2017/013117
§ 371 (c)(1),
(2) Date: Jul. 12, 2018

(87) PCT Pub. No.: WO2017/123706
PCT Pub. Date: Jul. 20, 2017

(65) Prior Publication Data
US 2019/0016182 A1 Jan. 17, 2019

Related U.S. Application Data

(60) Provisional application No. 62/277,996, filed on Jan. 13, 2016.

(51) Int. Cl.
*F16K 15/20* (2006.01)
*B60C 23/00* (2006.01)
(Continued)

(52) U.S. Cl.
CPC .......... *B60C 23/003* (2013.01); *F16K 11/048* (2013.01); *F16K 11/105* (2013.01)

(58) Field of Classification Search
CPC ..... B60C 23/003; F16K 11/048; F16K 11/105
(Continued)

(56) References Cited

U.S. PATENT DOCUMENTS 3,491,786 A 1/1970 Crossman
3,747,626 A 7/1973 Valentino
(Continued)

FOREIGN PATENT DOCUMENTS

EP 0511135 10/1992
WO 2016094633 6/2016

OTHER PUBLICATIONS

European Patent Office, International Search Report with Written Opinion issued in PCT/US2017/013117, dated Apr. 21, 2017, 12 pages, European Patent Office, Rijswijk, Netherlands.

*Primary Examiner* — Minh Q Le
(74) *Attorney, Agent, or Firm* — McCoy Russell LLP (57) ABSTRACT

A valve assembly for a tire pressure management system includes a housing. A first chamber (32) is provided in the housing. A second chamber (38) is provided in the housing. The second chamber is selectively in fluid communication with the first chamber. A third chamber (44) is provided in the housing. The third chamber is selectively in fluid communication with the second chamber. A deflate piston (120) is at least partially provided in the third chamber and the second chamber. The deflate piston (120) selectively permits or prevents fluid communication between the second chamber and the third chamber. An inflate piston (72) is attached to the deflate piston (120). The inflate piston (72) is at least partially provided in the second chamber and the first chamber. The inflate piston (72) selectively permits or prevents fluid communication between the first chamber and the second chamber. At a first pressure, the second chamber is in direct fluid communication with the first chamber and, at a second pressure, the second chamber is in direct fluid communication with the third chamber. The second pressure is greater than the first pressure and the first pressure is greater than an initial pressure.

17 Claims, 4 Drawing Sheets

(51) Int. Cl.
*F16K 11/048* (2006.01)
*F16K 11/10* (2006.01)

(58) Field of Classification Search
USPC .............. 137/596.1, 102, 225, 907; 152/416
See application file for complete search history.

(56) References Cited

U.S. PATENT DOCUMENTS

| | | | |
|---|---|---|---|
| 4,765,385 A | | 8/1988 | McGeachy |
| 4,893,664 A | * | 1/1990 | Oltean .................. B60C 23/003 |
| | | | 137/859 |
| 4,895,199 A | | 1/1990 | Magnuson |
| 5,261,471 A | | 11/1993 | Freigang |
| 5,309,969 A | | 5/1994 | Mittal |
| 5,554,688 A | | 9/1996 | Yashima |
| 6,672,382 B2 | | 1/2004 | Schultz |
| 6,796,323 B1 | * | 9/2004 | Taylor .................. G05D 16/166 |
| | | | 137/102 |
| 6,827,096 B1 | | 12/2004 | Kayukawa |
| 7,089,953 B2 | | 8/2006 | Beau |
| 7,104,274 B2 | | 9/2006 | Sampson |
| 7,624,752 B2 | | 12/2009 | Huang |
| 9,308,788 B2 | | 4/2016 | Fazekas |
| 2014/0224352 A1 | | 8/2014 | Racine |
| 2015/0075642 A1 | | 3/2015 | Fazekas |
| 2017/0268683 A1 | * | 9/2017 | Fazekas ................ B60C 23/003 |
| 2017/0299077 A1 | * | 10/2017 | Jabcon ................... F16K 21/06 |
| 2017/0361667 A1 | * | 12/2017 | Foor .................... B60C 23/003 |
| 2018/0087681 A1 | * | 3/2018 | Ehrlich .............. G05D 16/0663 |
| 2018/0312019 A1 | * | 11/2018 | Linzbach ............. B60C 23/003 |

* cited by examiner

VALVE ASSEMBLY FOR A TIRE PRESSURE MANAGEMENT SYSTEM

CROSS-REFERENCE TO RELATED APPLICATION

This application is claiming the benefit, under 35 U.S.C. 119(e), of the provisional U.S. patent application which was granted Ser. No. 62/277,996 and filed on Jan. 13, 2016, the entire disclosure of which is hereby incorporated by reference.

BACKGROUND OF THE INVENTION

The invention relates to a valve assembly for a tire pressure management system. More particularly, the invention relates to a wheel valve assembly for a tire pressure management system.

Tire pressure management systems such as, for example, central tire inflation systems can be utilized to manually and/or automatically inflate the pressure within a tire to a desired level. Tire pressure management systems such as central tire inflation systems are well known.

Typically, a tire pressure management system utilizes a wheel valve affixed to each wheel for effecting tire pressure adjustments. Due changes in terrain and/or load, it may be desirable to decrease the tire pressure. Also, it may be desirable to decrease tire pressure when a tire becomes overinflated do to a drop in the atmospheric pressure and/or a temperature increase caused by a change in the environmental or operating conditions. Wheel valves known in the art can be utilized to decrease tire pressure. However, the wheel valves known in the art do decrease tire pressure slowly which may not be desirable for certain applications. Also, the wheel valves known in the art are complex and expensive to manufacture.

Therefore, it would be desirable to provide a valve assembly which can decrease the tire pressure in a more robust manner.

BRIEF SUMMARY OF THE INVENTION

Embodiments of a valve assembly for a tire pressure management system are provided.

In an embodiment, the valve assembly comprises a housing. A first chamber is provided in the housing. A second chamber is provided in the housing. The second chamber is selectively in fluid communication with the first chamber. A third chamber is provided in the housing. The third chamber is selectively in fluid communication with the second chamber. A deflate piston is at least partially provided in the third chamber and the second chamber. The deflate piston selectively permits or prevents fluid communication between the second chamber and the third chamber. An inflate piston is attached to the deflate piston. The inflate piston is at least partially provided in the second chamber and the first chamber. The inflate piston selectively permits or prevents fluid communication between the first chamber and the second chamber. At a first pressure, the second chamber is in direct fluid communication with the first chamber and, at a second pressure, the second chamber is in direct fluid communication with the third chamber. The second pressure is greater than the first pressure and the first pressure is greater than an initial pressure.

In another embodiment, the valve assembly comprises a housing. A first chamber is provided in the housing. A second chamber is provided in the housing. The second chamber is selectively in fluid communication with the first chamber. A third chamber is provided in the housing. The third chamber is selectively in fluid communication with the second chamber. A deflate piston is at least partially provided in the third chamber and the second chamber. The deflate piston selectively permits or prevents fluid communication between the second chamber and the third chamber. An inflate piston is attached to the deflate piston. The inflate piston is at least partially provided in the second chamber and the first chamber. The inflate piston selectively permits or prevents fluid communication between the first chamber and the second chamber. At a first pressure, the second chamber is in fluid communication with the first chamber and the valve assembly is in a measurement state or an inflate state. At a second pressure, the second chamber is in fluid communication with the third chamber and the valve assembly is in a deflate state. The second pressure is greater than the first pressure and the first pressure is greater than an initial pressure.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Embodiments of a valve assembly 10, 10A are described below.

Preferably, the valve assembly 10, 10A is utilized as a wheel valve and with a tire pressure management system (not depicted) such as a central tire inflation system (CTIS). Tire pressure management systems known in the art are suitable for use with the valve assembly. In describing the operation of the valve assembly 10, 10A and tire pressure management system the terms "inflate" and "deflate," respectively, refer to an increase and decrease, respectively, of the pressure of the air in a tire or the like. Said terminology includes the words specifically mentioned above, derivatives thereof, and words of similar import.

Tire pressure management systems are utilized, for example, to inflate and/or deflate one or more tires of a vehicle (not depicted). The valve assembly 10, 10A described herein may have applications to vehicles for both light and heavy duty and for passenger, commercial, and off-highway vehicles. Furthermore, it would be understood by one of ordinary skill in the art that the valve assembly could have industrial, locomotive, military and aerospace applications.

Referring now to FIGS. 1-4, the valve assembly 10, 10A comprises a housing 12, 12A. A first chamber 32, a second chamber 38, and a third chamber 44 are provided in the housing 12, 12A. Preferably, the housing 12, 12A is attached to a wheel (not depicted) via one or more fasteners (not depicted). The one or more fasteners are utilized to secure the valve assembly 10, 10A to the wheel.

The wheel includes a tire positioned around a wheel rim. The tire houses pressurized air. The pressure of the air in the tire will hereinafter referred to as tire pressure. In certain embodiments described below, the valve assembly 10, 10A will be referred to as being in a rest state, measurement state, inflate state, or deflate state. The rest state refers to a condition where measuring, increasing or decreasing the tire pressure is not occurring. The measurement state refers to a condition where the tire pressure is being measured. The inflate state refers to a condition where the tire pressure is being increased. The deflate state refers to a condition where the tire pressure is being decreased.

The housing 12, 12A may be of a generally cylindrical shape. In an embodiment, the housing 12 comprises separate portions 14, 16, 18, 20 which are attached together. Separate seal members 24 are provided between the portions 14-20 of the housing 12 to prevent pressurized air from escaping therebetween. In an embodiment, each seal member 24 is an O-ring. In certain embodiments, like the one illustrated in FIG. 4, certain portions of the housing 12A may be formed in a unitary manner with each other to reduce the cost and complexity in forming the valve assembly and eliminate potential leak points in the housing. In still other embodiments (not depicted), the housing may be formed in a unitary manner.

Figure 1:
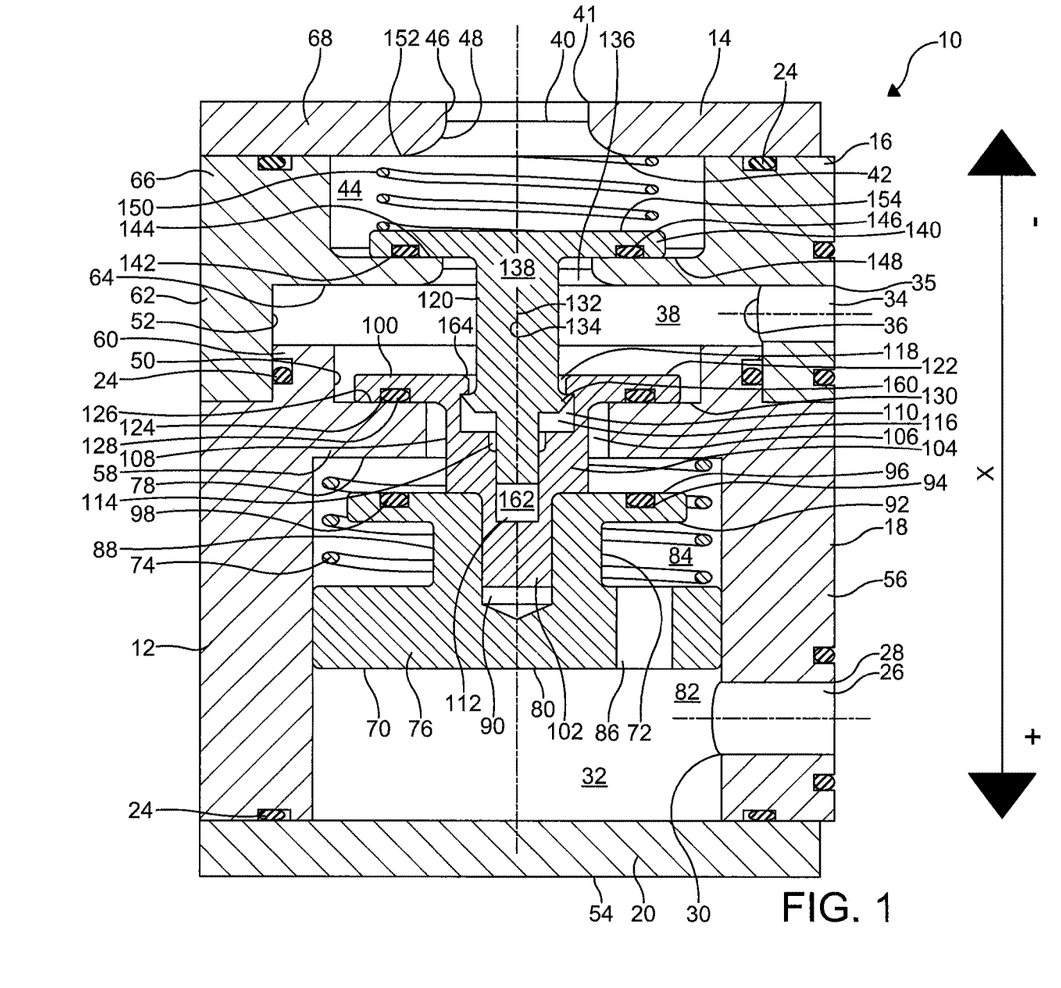
FIG. 1 is a cross-sectional view of an embodiment of a valve assembly, in a rest state, in accordance with the invention.

Referring now to FIG. 1, a control conduit 26 is provided through a portion 18 of the housing 12. The control conduit 26 may be of a cylindrical shape. On an end 28, the control conduit 26 is in fluid communication with the tire pressure management system. The control conduit 26 may be in fluid communication with the tire pressure management system via one or more additional fluid conduits (not depicted). On an opposite end 30, the control conduit 26 is in fluid communication with the first chamber 32.

A tire conduit 34 is provided through another portion 16 of the housing 12. The tire conduit 34 may be of a cylindrical shape. On an end 35, the tire conduit 34 is in fluid communication with the tire. The tire conduit 34 may be in fluid communication with the tire via another fluid conduit (not depicted). The fluid conduit may be provided through the wheel rim or external to the wheel. On an opposite end 36, the tire conduit is in fluid communication with the second chamber 38.

Figure 2:
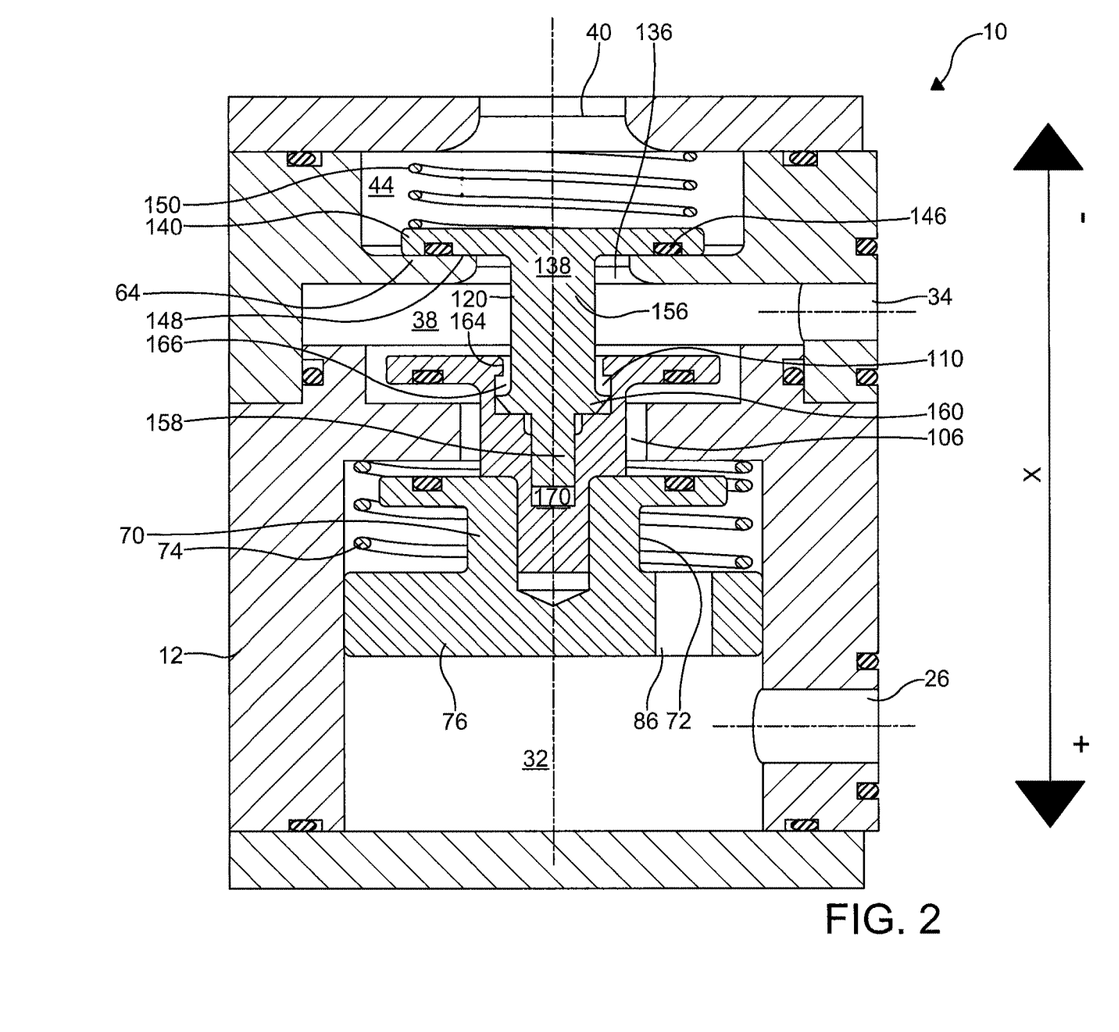
FIG. 2 is a cross-sectional view of the valve assembly of FIG. 1 in a measurement state or inflate state.
Figure 3:
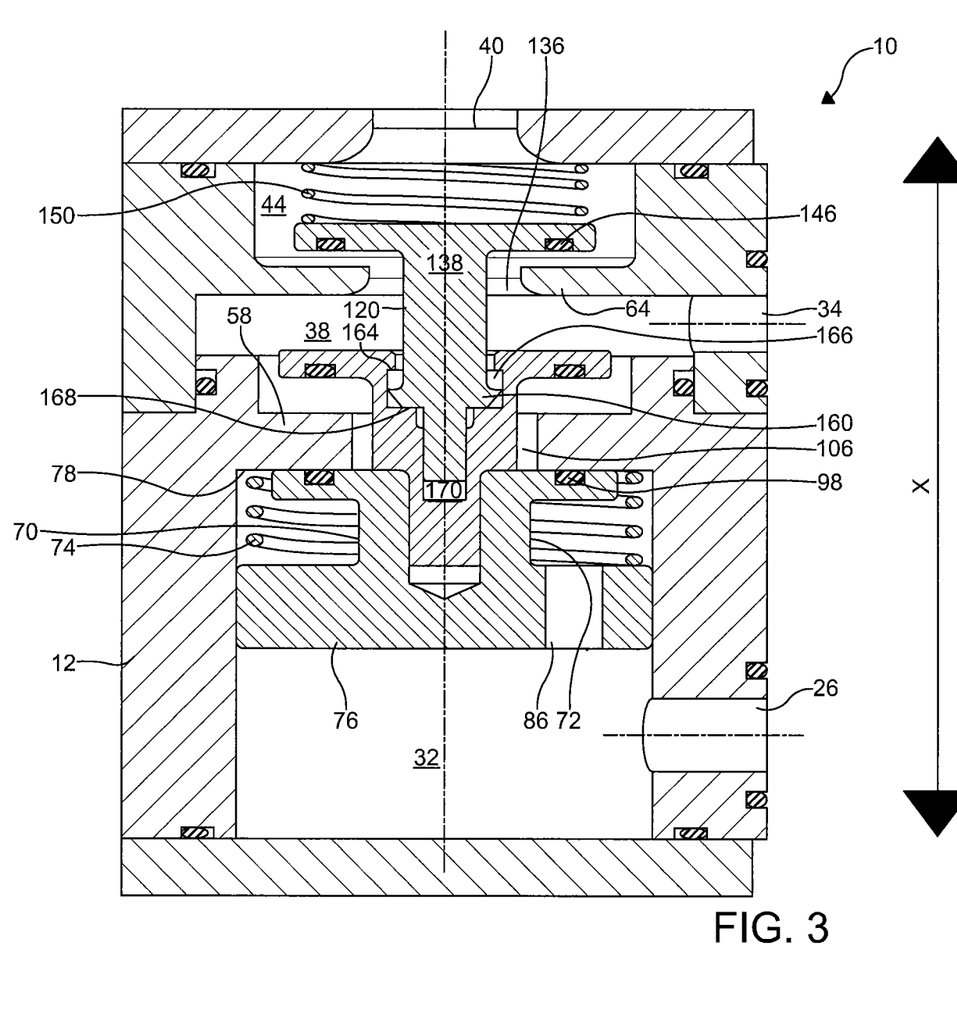
FIG. 3 is a cross-sectional view of the valve assembly of FIG. 1 in a deflate state.

A deflate conduit 40 is provided through another portion 14 of the housing 12. On an end 41, the deflate conduit 40 is in fluid communication with the atmosphere. On an opposite end 42, the deflate conduit 40 is in fluid communication with the third chamber 44. As illustrated in FIGS. 1-3, the deflate conduit 40 may comprise a portion 46 which is of a cylindrical shape. The cylindrically-shaped portion may be attached to another portion 48 of the deflate conduit 40 with a diameter that gradually increases toward the third chamber 44. In certain embodiments, like the one illustrated in FIG. 4, a filter 49 may be provided in the deflate conduit 40. The filter 49 is utilized to prevent dirt and debris from entering the valve assembly through the deflate conduit 40. The filter 49 may be retained within the deflate conduit 40 via a threaded connection or with a retaining ring (not depicted).

The first chamber 32 and the third chamber 44 are each of a generally cylindrical shape. The second chamber 38 is located between the first chamber 32 and the third chamber 44, separates the first chamber 32 from the third chamber 44, and is selectively in fluid communication with each chamber 32, 44. The second chamber 38 may comprise a first diameter portion 50 and a second diameter portion 52. The diameter of the first diameter portion 50 is less than the diameter of the second diameter portion 52. The first diameter portion 50 and the second diameter portion 52 may each be of a generally cylindrical shape.

As noted above, the second chamber 38 is selectively in fluid communication with the first chamber 32 and the third chamber 44. In the rest state, which is shown in FIG. 1, the second chamber 38 is not in fluid communication with the first chamber 32 or the third chamber 44. The second chamber 38 is in fluid communication with the first chamber 32 when the valve assembly 10, 10A is in the measurement state or inflate state and the tire pressure is being measured or increased. When the tire pressure is being measured or increased, the second chamber 38 is not in fluid communication with the third chamber 44. The second chamber 38 is in fluid communication with the third chamber 44 when the valve assembly 10, 10A is in the deflate state and the tire pressure is being decreased. When the tire pressure is being decreased, the second chamber 38 is not in fluid communication with the first chamber 32.

The first chamber 32 is defined by a first end wall 54, a first side wall 56, and a second end wall 58. The second chamber 38 is defined by the second end wall 58, a second side wall 60, a third side wall 62, and a third end wall 64. In an embodiment, the tire conduit 34 is formed through the third sidewall 62. The third chamber 44 is defined by the third end wall 64, a fourth side wall 66, and a fourth end wall 68. In an embodiment, the deflate conduit 40 is formed through the fourth end wall 68.

An inflate piston 72 selectively permits or prevents fluid communication between the first chamber 32 and the second chamber 38. At least a portion of the inflate piston 72 is provided in the first chamber. In an embodiment, a first member 70 of the inflate piston 72 is provided in the first chamber 32. The first member 70 may be formed in a unitary manner. A first biasing member 74 is also provided in the first chamber 32 and is positioned between the second end wall 58 and a first end portion 76 of the first member 70. In this position, the first biasing member 74 is provided around one or more portions of the inflate piston 72 and contacts a first surface 78 of the second end wall 58 and the first end portion 76. The first biasing member 74 may be a helical spring. The first biasing member 74 biases the first member 70 away from the second end wall 58.

The first end portion 76 defines a first end 80 of the inflate piston 72. The first end 80 is positioned adjacent the control conduit 26. The first end portion 76 also separates a first portion 82 and a second portion 84 of the first chamber 32. One or more apertures 86 are provided through the first end portion 76 which allows the first portion 82 and second portion 84 of the first chamber 32 to communicate. In embodiments where two or more apertures 86 are provided, the apertures 86 are equally spaced apart from each other and circumferentially spaced about the first end portion 76. In one such embodiment, five apertures are provided.

A stem portion 88 is attached to the first end portion 76 on a first end thereof. The stem portion 88 extends from the first end portion 76 into the second portion 84 of the first chamber 32. The stem portion 88 is a cylindrically shaped body and has a cavity 90 formed therethrough.

A first flange portion 92 is attached to the stem portion 88 on a second end thereof. The first flange portion 92 extends radially from the stem portion 88 in the second portion 84 of the first chamber 32. An annular groove 94 is provided in a first surface 96 of the first flange portion 92. A sealing member 98 is provided in the annular groove 94. In an embodiment, the annular groove 94 is of the dovetail variety. In another embodiment, the sealing member 98 is an O-ring. As is shown in FIG. 3, the sealing member 98 provides a seal between the inflate piston 72 and the first surface 78 of the second end wall 58 when the tire pressure is being decreased and the valve assembly 10 is in the deflate state.

The inflate piston 72 also comprises a second member 100. The second member 100 extends from the first chamber 32 into the second chamber 38. Thus, at least a portion of the inflate piston 72 is provided in the second chamber 38. The second member 100 is attached to the first member 70. To attach the second member 100 to the first member 70, a first cylindrically-shaped portion 102 of the second member 100 extends into the cavity 90 in the stem portion 88. A second cylindrically-shaped portion 104 is attached to the first cylindrically-shaped portion 102. The second cylindrically-shaped portion 104 extends through an aperture 106, 106A provided through the second end wall 58 and into the second chamber 38. The second end wall aperture 106, 106A is of a cylindrical shape. The second end wall aperture 106, 106A is of a diameter which is greater than a diameter which is defined by an outer surface 108 of the second cylindrically-shaped portion 104. In an embodiment like the one illustrated in FIGS. 1-3, the second end wall aperture 106 is utilized to communicate pressurized air in the first chamber 32 directly to the second chamber 38 and vice versa when the first chamber 32 and the second chamber 38 are in fluid communication. In this embodiment, a space separates the surface of the second end wall 58 that defines the second end wall aperture 106 and the outer surface 108 of the second cylindrically-shaped portion 104. In other embodiments, like the one illustrated in FIG. 4, one or more openings 107 are provided in the second end wall 58. Instead of communicating pressurized air utilizing the second end wall aperture 106A, the one or more openings 107 are utilized to communicate pressurized air in the first chamber 32 to the second chamber 38 and vice versa when the first chamber 32 and the second chamber 38 are in fluid communication. In another such embodiment, two or more openings 107 are provided in the second end wall 58 to communicate pressurized air in the first chamber 32 to the second chamber 38 and vice versa when the first chamber 32 and the second chamber 38 are in fluid communication. In this embodiment, the two or more openings are provided in a spaced apart relationship with each other and circumferentially about the second end wall aperture 106A. In yet other embodiments (not depicted), one or more grooves are provided in the outer surface of the second cylindrically-shaped portion to communicate pressurized air in the first chamber to the second chamber and vice versa. In another such embodiment, two or more grooves are provided in the outer surface of the second cylindrically-shaped portion to communicate pressurized air in the first chamber to the second chamber and vice versa. In this embodiment, the two or more grooves are provided in a spaced apart relationship with each other and circumferentially about the outer surface of the second cylindrically-shaped portion.

The second cylindrically-shaped portion 104 is hollow and has a cavity 110. The cavity 110 includes a first portion 112 which is of an elongated cylindrically-shape. The cavity 110 also includes a second portion 114 attached to the first portion 112. The second portion 114 is of a diameter which is greater than the first portion 112. The cavity 110 further includes a third portion 116. The third portion 116 is of a diameter which is greater than the second portion 114. Additionally, the cavity includes a fourth portion 118. The fourth portion 118 is of a diameter which is less than the third portion 116. The reduced diameter of the fourth portion 118 allows a deflate piston 120 to be interlocked with the inflate piston 72.

The second cylindrically-shaped portion 104 is attached to a second flange portion 122. The second flange portion 122 extends radially from the second cylindrically-shaped portion 104 in the second chamber 38. An annular groove 124 is provided in a first surface 126 of the second flange portion 122. A sealing member 128 is provided in the annular groove 124. In an embodiment, the annular groove 124 is of the dovetail variety. In another embodiment, the sealing member 128 is an O-ring. As is shown in FIG. 1, the sealing member 128 provides a seal between the inflate piston 72 and a second surface 130 of the second end wall 58 when the valve assembly 10 is in the rest state. It should be noted that the bias provided by the first biasing member 74 to the inflate piston 72 is in the positive X direction and it provides positive X direction loading to the inflate piston 72 when the valve assembly 10 is in the rest state.

The deflate piston 120 is attached to the second member 100 of the inflate piston 72. The inflate piston 72 and the deflate piston 120 each have a centerline 132, 134. The centerline 132 of the inflate piston 72 and the centerline 134 of the deflate piston 120 are aligned.

The deflate piston 120 selectively permits or prevents fluid communication between the second chamber 38 and the third chamber 44. At least a portion of the deflate piston 120 is provided in the second chamber 38. The deflate piston 120 extends through an aperture 136 provided through the third end wall 64 into the third chamber 44. The deflate piston 120 is movable within the second chamber 38 and the third chamber 44.

The deflate piston 120 is a solid member and comprises a body portion 138 and a third flange portion 140. The third flange portion 140 extends radially from the body portion 138 in the third chamber 44. An annular groove 142 is provided in a first surface 144 of the third flange portion 140. A sealing member 146 is provided in the annular groove 142. In an embodiment, the annular groove 142 is of the dovetail variety. In another embodiment, the sealing member 146 is an O-ring. As is shown in FIGS. 1 and 2, the sealing member 146 provides a seal between the deflate piston 120 and a second surface 148 of the third end wall 64 when the valve assembly 10 is in the rest state, measurement state or the inflate state. The second surface 148 of the third end wall 64 faces the third chamber 44.

The third flange portion 140 has an outer diameter 149. In an embodiment, like the one illustrated in FIG. 4, the outer diameter 149 of the third flange portion 140 is less than an outer diameter 151 of the second flange portion 122. In another embodiment, the outer diameter 151 of the second flange portion 122 is less than an outer diameter 153 of the first flange portion 92. Configuring the outer diameters 149, 151, 153 of the flange portions 92, 122, 140 as described above may be preferred in order to balance the forces applied by the pressurized air to each flange portion 92, 122, 140 as the valve assembly 10, 10A moves between the rest, measurement, inflate and deflate state.

A second biasing member 150 is provided in the third chamber 44 and contacts a surface 152 of the fourth end wall 68 and a second surface 154 of the third flange portion 140. The second biasing member 150 may be a helical spring. The second biasing member 150 biases the deflate piston 120 toward the third end wall 64. Thus, the bias provided by the second biasing member 150 to the deflate piston 120 is in the positive X direction. As such, the bias provided by the second biasing member 150, which is applied to the deflate piston 120, is in the same direction as the bias provided by the first biasing member 74, which is applied to the inflate piston 72. However, the bias provided by the second biasing member 150 is greater than the bias provided by the first biasing member 74.

Referring now to FIG. 2, the body portion 138 comprises a main body portion 156 attached, on a first end, to the flange portion 140 and, on a second end, to a stem portion 158. The main body portion 156 is provided in the second chamber 38 and extends through the aperture 136 provided through the third end wall 64. The third end wall aperture 136 is utilized to communicate pressurized air in the second chamber 38 directly to the third chamber 44 when the valve assembly 10 is in a deflate state. The third end wall aperture 136 may comprise a portion which is of a cylindrical shape. The cylindrically-shaped portion may be attached to another portion of the third end wall aperture 136 with a diameter that gradually increases toward the second chamber 38.

The main body portion 156 also extends into the cavity 110 provided in the second member 100 of the inflate piston 72. The main body portion 156 is of a cylindrical shape. An annular upset 160 is provided at the second end of the main body portion 156. The annular upset 160 has a diameter which is greater than the diameter of the fourth portion 118 of the cavity 110. Thus, as shown best in FIG. 1, the inflate piston 72 and the deflate piston 120 are attached to each other via an interlock provided by the reduced diameter of the cavity 110 and the annular upset 160. The interlock and the biases provided by the first biasing member 74 and the second biasing member 150 provide positive X direction loading to the deflate piston 120.

The stem portion 158 is of a cylindrical shape and extends from the second end of the main body portion 156 into the first portion 112 of the cavity 110. As illustrated in FIG. 1, when the valve assembly 10 is in the rest state, a first space 162 is provided between a first end of the cavity 110 and an end of the stem portion 158. In this condition, the annular upset 160 contacts and abuts a first inner shoulder 164 of the second member 100. The first shoulder 164 extends radially and defines a first end of the third portion 116 of the cavity 110. When the valve assembly 10 is in the measurement state, inflate state or deflate state, as is illustrated in FIGS. 2-3, a space 166 is provided between the annular upset 160 and the first inner shoulder 164. Also, under these conditions, the second end of the main body portion 156 contacts and abuts a second inner shoulder 168 of the second member 100. The second inner shoulder 168 extends radially and is in a parallel relationship with the first inner shoulder 164. Also, the second inner shoulder 168 defines a second end of the third portion 116 of the cavity 110. Further, when the valve assembly 10 is in the measurement state, inflate state or deflate state, a second space 170 is provided between the first end of the cavity 110 and the end of the stem portion 158. The first space 162 provided between the first end of the cavity 110 and the end of the stem portion 158 is greater than the second space 170 provided between the first end of the cavity 110 and the end of the stem portion 158.

Operation of the valve assembly 10 will now be discussed with reference to FIGS. 1-4.

Figure 4:
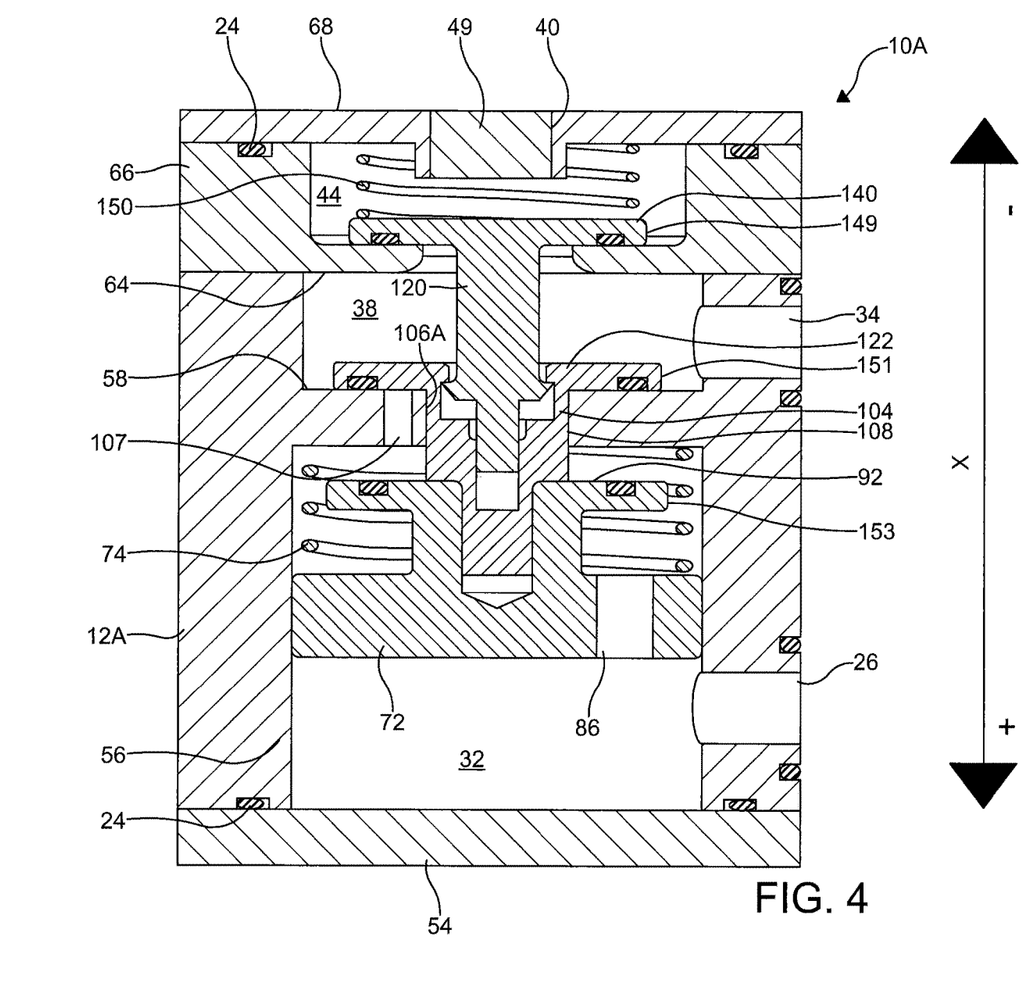
FIG. 4 is a cross-sectional view illustrating additional embodiments of a valve assembly, in a rest state, in accordance with the invention.

In the rest state, which is illustrated in FIGS. 1 and 4, the first chamber 32 is not in fluid communication with the second chamber 38 or the third chamber 44 and the second chamber 38 is not in fluid communication with the third chamber 44. However, in this state, it is preferred that the first chamber 32 is vented to and in fluid communication with the atmosphere via another portion of the tire pressure management system in fluid communication with the control conduit 26. Also, in this state, the second chamber 38 is in fluid communication with the pressurized air housed within the tire and the third chamber 44 is in fluid communication with the atmosphere.

As should be appreciated, the inflate piston 72 is movable within the first chamber 32 and the second chamber 38. In the rest state, the air in the first chamber 32 is at an initial pressure. The initial pressure may be equal to atmospheric pressure. In order to move from the rest state to the measurement state or the inflate state, a flow of pressurized air is directed from a source of pressurized air (not depicted) through the tire pressure management system to the control conduit 26.

From the source of pressurized air, the flow of pressurized air may be directed to a pneumatic control unit (not depicted). Pneumatic control units known in the art are suitable for use with the valve assembly. The pneumatic control unit may comprise one or more valve assemblies and a pressure regulator. The pressure regulator is utilized to provide the flow of pressurized air at two or more predetermined pressures. The one or more valve assemblies and the pressure regulator may be controlled by providing an electronic control portion (not depicted). To control the one or more valve assemblies and the pressure regulator, the electronic control portion may output signals to these members. The output signals may be in the form of electrical current.

The electronic control portion may include a microprocessor operating under the control of a set of programming instructions, which may also be referred to as software. The electronic control portion may include a memory in which the programming instructions are stored. The memory can also store identification codes, tire pressure records and/or user inputs over a period of time.

The electronic control portion may receive input signals from a pressure sensor (not depicted) and one or more sensors (not depicted) such as, for example, a load sensor or a speed sensor. The load sensor and speed sensor may each be conventional in the art. Also, the pressure sensor may also be referred to as a pressure transducer in the art. The electronic control portion may also receive input signals from an operator control device (not depicted). The operator control device permits an operator of the vehicle to transmit control signals to the electronic control portion to adjust the tire pressure.

From the control conduit 26, the pressurized air enters the first chamber 32. The flow of pressurized air is provided in the first chamber 32 at a first pressure and provides a bias on the inflate piston 72. The bias provided by the pressurized air is in the negative X direction, which is in a direction that is opposite the bias provided by the first biasing member 74 to the inflate piston 72. The first pressure of the pressurized air is greater than the initial pressure of the air in the first chamber 32. Also, the first pressure of the pressurized air is greater than the tire pressure. Further, the bias provided by the pressurized air at the first pressure is greater than the bias provided by the first biasing member 74.

The bias provided by the pressurized air urges the inflate piston 72 in the negative X direction. As illustrated in FIG. 2, when the inflate piston 72 is urged in the negative X direction by the pressurized air, the first biasing member 74 is compressed and the first chamber 32 is placed into direct fluid communication with the second chamber 38. Also, when the inflate piston 72 is urged in the negative X direction by the pressurized air at the first pressure, the second end of the main body portion 156 contacts the second inner shoulder 168 of the second member 100. The contact between the second end of the main body portion 156 and the second inner shoulder 168 and the bias provided by the second biasing member 150 prevents the inflate piston 72 from moving further in the negative X direction. Under these conditions, the second chamber 38 is not in fluid communication with the third chamber 44.

Placing the first chamber 32 into fluid communication with the second chamber 38 places the valve assembly 10, 10A in the measurement state or the inflate state and allows the control conduit 26 and the tire conduit 34 to communicate so that the tire pressure can be measured or increased. Once the first chamber 32 is placed into fluid communication with the second chamber 38, pressurized air from the second chamber 38 can be directed to the first chamber 32 to measure the tire pressure. Alternatively, once the first chamber 32 is placed into fluid communication with the second chamber 38, pressurized air from the first chamber 32 can be directed to the second chamber 38 to increase the tire pressure.

When the tire pressure is being measured, it may be desirable to use pulses of pressurized air to assist in pressuring the one or more additional fluid conduits of the tire pressure management system that are in fluid communication with the control conduit 26. Utilizing pulses of air to measure the tire pressure assists in filling the fluid conduits with pressurized air without having to remove a large quantity of pressurized air from the tire to do so. Further, as illustrated in FIG. 2, when the valve assembly 10 changes from the rest state to the measurement or inflate state, the deflate piston 120 does not change its position.

In order to move to the deflate state from the rest state, measurement state or inflate state, a flow of pressurized air is directed from the source of pressurized air through the tire pressure management system to the control conduit 26. The flow of pressurized air is provided at a second pressure. The second pressure of the flow of pressurized air is greater than the first pressure thereof.

From the control conduit 26, the pressurized air enters the first chamber 32. As noted above, to move to the deflate state, the pressurized air is provided at the second pressure. In the first chamber 32, the pressurized air is at the second pressure and provides a bias on the inflate piston 72. The bias provided by the pressurized air is in the negative X direction, which is in a direction that is opposite the bias provided by the first biasing member 74 to the inflate piston 72. The second pressure of the pressurized air is greater than the first pressure so that the bias it provides is greater than the bias provided by the first pressure. Thus, the second pressure of the pressurized air is greater than the tire pressure. Also, the bias provided by the pressurized air at the second pressure is greater than the bias provided by the first biasing member 74.

The bias provided by the pressurized air at the second pressure urges the inflate piston 72 in the negative X direction. As illustrated in FIG. 3, when the inflate piston 72 is urged in the negative X direction by the second pressure of the pressurized air, the first biasing member 74 is compressed to a greater extent than during the measurement state or the inflate state. Also, the bias provided by the pressurized air at the second pressure is such that the deflate piston 120 is urged in the negative X direction. Urging the deflate piston 120 in the negative X direction, compresses the second biasing member 150.

Under these conditions, the second chamber 38 is placed into direct fluid communication with the third chamber 44. Also, under these conditions, the second chamber 38 is not in fluid communication with the first chamber 32. Placing the second chamber 38 into fluid communication with the third chamber 44 places the valve assembly 10, 10A in the deflate state and allows the tire conduit 34 and the deflate conduit 40 to communicate so that the tire pressure can be decreased. As noted above, the second chamber 38 is in fluid communication with the pressurized air in the tire via the tire conduit 34. Thus, once the second chamber 38 is placed into fluid communication with the third chamber 44, pressurized air from the tire can be directed to the third chamber 44 via the second chamber 38 and the aperture 136 provided through the third end wall 64. From the third chamber 44, the pressurized air is directed to the atmosphere via the deflate conduit 40 provided through the fourth end wall 68. Thus, the tire pressure is decreased by directing pressurized air from the tire to the atmosphere.

To move the valve assembly 10 from the measurement state, inflate state or deflate state back to the rest state, the pressurized air in the control conduit 26 is vented. Venting the control conduit 26 removes the pressurized air from the first chamber 32 and the bias provided thereby. Also, venting the control conduit 26 returns the pressure in the first chamber 32 to the initial pressure. Once the bias provided by the pressurized air is removed, the bias provided by the first biasing member 74 urges the inflate piston 72 in the positive X direction which places the valve assembly 10 back into the rest state. If the valve assembly 10 was moving from the deflate state back to the rest state, then the biases provided by the first biasing member 74 and the second biasing member 150 urges the inflate piston 72 and the deflate piston 120 in the positive X direction.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

The invention claimed is:

1. A valve assembly for a tire pressure management system, comprising:
   a housing:
   a first chamber provided in the housing;
   a second chamber provided in the housing, the second chamber being selectively in fluid communication with the first chamber;
   a third chamber provided in the housing and selectively in fluid communication with the second chamber;
   a deflate piston at least partially provided in the third chamber and the second chamber, wherein the deflate piston selectively permits or prevents fluid communication between the second chamber and the third chamber;

an inflate piston attached to the deflate piston, the inflate piston at least partially provided in the second chamber and the first chamber, wherein the inflate piston selectively permits or prevents fluid communication between the first chamber and the second chamber;

a first biasing member provided in the first chamber and around a portion of the inflate piston; and a second biasing member provided in the third chamber, wherein a bias provided by the second biasing member is greater than a bias provided by the first biasing member;

wherein, at a first pressure, the second chamber is in direct fluid communication with the first chamber and, at a second pressure, the second chamber is in direct fluid communication with the third chamber, the second pressure being greater than the first pressure and the first pressure being greater than an initial pressure.

2. The valve assembly of claim 1, wherein the second chamber is in fluid communication with the first chamber when a tire pressure is being measured or increased and the second chamber is in fluid communication with the third chamber when the tire pressure is being decreased.

3. The valve assembly of claim 1, further comprising a control conduit in fluid communication with the tire pressure management system on an end and the first chamber on an opposite end.

4. The valve assembly of claim 1, further comprising a tire conduit, the tire conduit formed through a sidewall of the housing and in fluid communication with a tire on an end and the second chamber on an opposite end, and a deflate conduit, the deflate conduit formed through an end wall of the housing and in fluid communication with atmosphere on an end and the third chamber on an opposite end.

5. The valve assembly of claim 1, wherein the inflate piston comprises a first member and a second member, the second member attached to the first member and extending from the first chamber to the second chamber through an aperture in an end wall, the end wall at least partially defining the first chamber and the second chamber.

6. The valve assembly of claim 1, wherein the inflate piston comprises a first member and the first chamber comprises a first portion and a second portion, the first portion and second portion separated from each other by a first end portion of the first member and in fluid communication with each other via one or more apertures provided through the first end portion.

7. The valve assembly of claim 1, wherein the inflate piston is attached to the deflate piston via an interlock.

8. The valve assembly of claim 1, wherein the deflate piston extends from the second chamber to the third chamber through an aperture in an end wall, the end wall at least partially defining the second chamber and the third chamber.

9. The valve assembly of claim 1, further comprising a sealing member which provides a seal between the deflate piston and a surface of the end wall when the valve assembly is in a rest state, measurement state, or an inflate state, wherein the surface of the end wall faces the third chamber.

10. The valve assembly of claim 9, further comprising a biasing member provided in the third chamber, the biasing member contacting the deflate piston to bias the deflate piston toward the end wall.

11. The valve assembly of claim 1, wherein the first biasing member biases a first member of the inflate piston away from an end wall of the housing, the end wall at least partially defining the first chamber.

12. The valve assembly of claim 11, further comprising a first sealing member which provides a seal between the inflate piston and a first surface of the end wall when the valve assembly is in a deflate state.

13. The valve assembly of claim 12, further comprising a second sealing member which provides a seal between the inflate piston and a second surface of the end wall when the valve assembly is in a rest state.

14. The valve assembly of claim 1, wherein the bias of the second biasing member is applied to the deflate piston and the bias of the first biasing member is applied to the inflate piston, the biases of the first biasing member and the second biasing member being provided in the same direction.

15. A valve assembly for a tire pressure management system, comprising:
 a housing;
 a first chamber provided in the housing;
 a second chamber provided in the housing, the second chamber being selectively in fluid communication with the first chamber;
 a third chamber provided in the housing and selectively in fluid communication with the second chamber;
 a deflate piston at least partially provided in the third chamber and the second chamber, wherein the deflate piston selectively permits or prevents fluid communication between the second chamber and the third chamber;
 an inflate piston attached to the deflate piston, the inflate piston at least partially provided in the second chamber and the first chamber, wherein the inflate piston selectively permits or prevents fluid communication between the first chamber and the second chamber;
 a first biasing member provided in the first chamber and around a portion of the inflate piston; and
 a second biasing member provided in the third chamber, wherein a bias provided by the second biasing member is greater than a bias provided by the first biasing member;
 wherein, at a first pressure, the second chamber is in fluid communication with the first chamber and the valve assembly is in a measurement state or an inflate state and, at a second pressure, the second chamber is in fluid communication with the third chamber and the valve assembly is in a deflate state, the second pressure being greater than the first pressure and the first pressure being greater than an initial pressure.

16. The valve assembly of claim 15, wherein the valve assembly is in a rest state at the initial pressure.

17. The valve assembly of claim 15, wherein the second chamber is located between the first chamber and the third chamber.

* * * * *